July 31, 1962 W. H. STICKNEY 3,047,458
DISTENDED MOLDING OF PAPER PULP
Filed Dec. 19, 1960
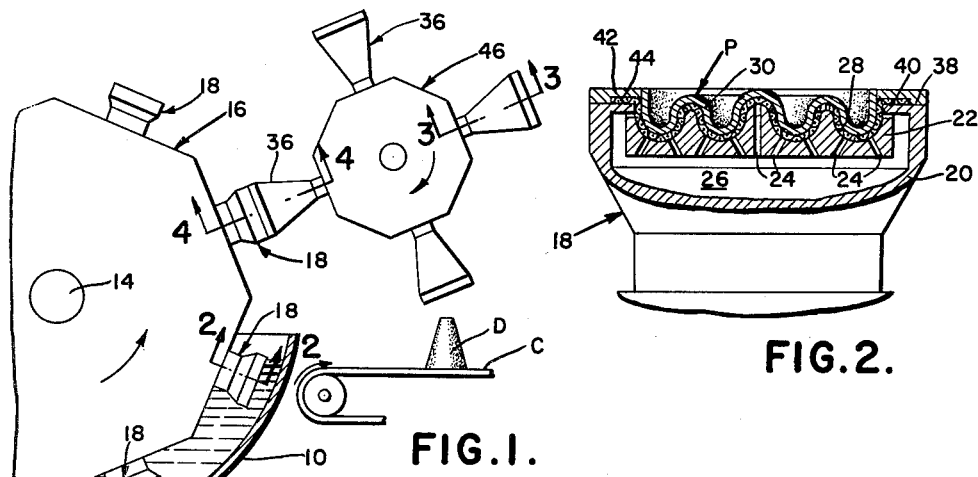
FIG.2.
FIG.1.
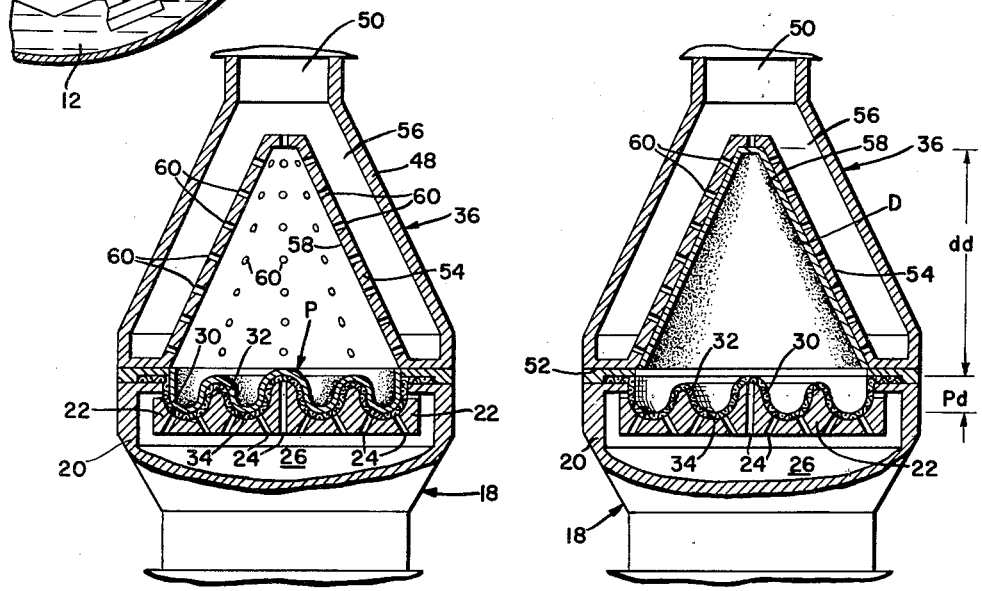
FIG.4. FIG.5.
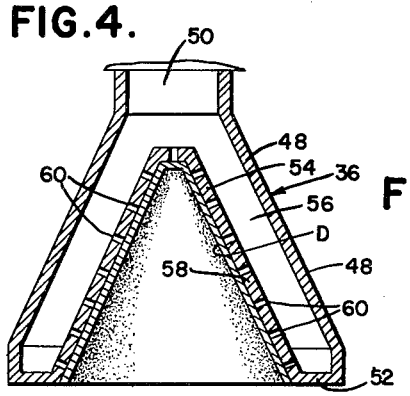
FIG.3.
*INVENTOR*
Wendell H. Stickney
BY *Karl W. Flocks*
*ATTORNEY*

United States Patent Office 3,047,458
Patented July 31, 1962

3,047,458
DISTENDED MOLDING OF PAPER PULP
Wendell H. Stickney, Springdale, Conn., assignor to Diamond National Corporation, New York, N.Y., a corporation of Delaware
Filed Dec. 19, 1960, Ser. No. 76,699
5 Claims. (Cl. 162—223)

This invention is related generally to the forming of molded pulp articles and is more particularly directed to the method and apparatus for forming a molded pulp preform and while still wet distending the same to an irregular shape which is not practical or feasible in the initial forming of the preform.

Conventionally, a slurry tank of pulp is provided, a forming mold is immersed in the tank and by utilizing a negative pressure in the mold a layer of the slurry is deposited in the mold to form a preform. The configuration of the preform is generally substantially that of the finished article, and after the preform is deposited, the mold is oriented into position with respect to a transfer had by using reverse pressure of negative pressure in the transfer head. The transfer head normally comprises a mirror image of the mold and may function to press residual moisture from the preform. Attempts have been made to alter the configuration of the wet preform during transfer from the mold to the transfer head; however, these changes have generally comprised the formation of ribs, rims or folds.

A primary object of this invention is to provide novel apparatus and a novel method whereby a preform may be deposited in mold of standard equipment and may be subsequently altered to an irregular shape and size which could not be feasily formed on the standard equipment without extensive modification and expenditure of the equipment available.

Another object of the invention is to provide novel apparatus and a novel method whereby a preform is formed using sufficient material to permit the subsequent formation of different shape substantially different in external appearance and dimensions from the original preform shape, without additional manipulative steps or drastic modification of any conventional procedures or apparatus.

Another object and the nature and advantages of the instant invention will become apparent from the following description taken in conjunction with the accompanying drawings of an exemplary embodiment of the invention wherein:

FIG. 1 is an essentially diagrammatic side elevation of an installation in which the invention is used.

FIG. 2 is an enlarged sectional view taken on line 2—2 of FIG. 1, showing a mold upon which a preform has been initially deposited.

FIG. 3 is an enlarged, substantially sectional view taken on line 3—3 of FIG. 1, showing a transfer head within which a distended preform has been substantially altered in configuration and dimensions from an originally deposited preform.

FIG. 4 is an enlarged, substantially sectional view taken on line 4—4 of FIG. 1, showing the cooperating relationship between a mold and transfer head, and illustrating the preform still in the mold subsequent to transfer and distention in the transfer head, and FIG. 5 is a view similar to FIG. 4 showing the manner in which a wet preform has been deposited and distended from the condition shown in FIGS. 2 and 4 to assure the condition shown in FIG. 3.

It will be noted in the exemplary embodiment the mold and transfer head have a circular cross section, however, this showing is merely illustrative inasmuch as it will be appreciated by those skilled in the art that other cross sections such as rectangular, oval, etc. may readily lend themselves to use within the purview of the invention.

Referring to the drawings in detail, in FIG. 1 a fragmentary portion of a pulp slurry tank is indicated generally at 10 and will have maintained therein a predetermined level of pulp slurry 12 as is conventional.

Mounted for rotation on a horizontal axis 14 is a rotatable suction mold assembly 16. The mold assembly may include means (not shown) for periodically providing directing negative pressure and pressure at a plurality of circumferentially spaced and radially extending molds indicated generally at 18. The assembly 16 is rotated in the direction indicated and due to periodically controlled negative pressure in the molds 18 a preform P is deposited in the molds as they are progressively immersed in the slurry 12.

The molds 18 comprise a tubular head 20 including a die or mold portion 22 which extends transversely thereacross and has a plurality of transverse passage portions 24. The passage portions 24 communicate with a chamber 26 formed within the head 20 and terminate at the outer face 28 of die or mold portion 22. The face 28 of the portion 22 is covered by a suitable mesh screen 30 conforming to the face 28 which comprises a plurality of continuous spaced rib and groove portions 32 and 34, respectively, forming a sinusoidal cross-section as seen in FIGS. 2, 4 and 5.

This sinusoidal cross section will provide sufficient material in the rather shallow depth preform P to permit the distended preform to be formed in the transfer heads indicated generally at 36.

The head 20 of the molds 18 includes a peripheral surface portion 38 upon which is received a marginal flange portion 40 of the screen 30. A clamp plate 42 is undercut at 44 to receive the flange portion 40 therebeneath and is secured to the surface 38 in any suitable manner.

Referring to FIG. 1, a transfer head assembly 46 is rotatable about a horizontal axis 48 and includes a plurality of circumferentially spaced and radially extending transfer head assemblies which will progressively mate with a mold 18 when rotated, as shown, for example, in FIGS. 1 and 4.

The transfer head assemblies 36 will be sequentially subject to a source providing negative and positive pressure therein whereby each wet preform P is distendingly transferred from the molds 18 to the heads 36 when the heads 36 are subject to a negative pressure therein, and the distended or reformed preform D is discharged onto a conveyor C, FIG. 1, when an internal pressure is metered to the heads 36.

The transfer head assemblies 36 each comprise an elongated body portion 48 having a tubular inlet 50 which will communicate with a timed source of vacuum and pressure. The tubular inlet 50 is integral with a frusto-conical body portion terminating in a peripheral sealing surface 52 periodically engaged on the outer surface of one of the plates 42 of the molds 18. The body portion 48 includes an inner frusto-conical wall 54 forming an inner chamber 56 in communication with the inlet 50 and which communicates with the outer surface 58 of the wall 54 by means of suitably spaced transverse apertures 60 in the wall 54. Although not shown, if necessary the outer surface 58 of the wall 54 may have secured thereover a conforming screen, similar to screen 30, previously described.

*Operation*

The assembly 16 and molds 18 will be of conventional size and dimensions and accordingly will require no modification of tank 10 or molds 18 to produce the irregular and great depth articles capable of being produced by the distending or reforming transfer heads 36. As the assembly 16 is rotated, the preforms P will be deposited on the screen 30 (see FIG. 2) of the molds 18.

As the molds 18 are rotated they will periodically mate with a transfer head 36, at which time the negative pressure in chamber 26 of the molds 18 is eliminated or replaced by a positive pressure (see FIG. 4). At this time a negative pressure is created in chamber 56 of head 36, at which time the preform P is not only transferred to head 36 (see FIG. 5), but its distended depth dd will be many times beyond the practical depth Pd of the mold 18, i.e., the practical depth being that which is conventionally producible on standard equipment using conventional molds.

The sinusoidal cross section of the preform P will afford sufficient pulp material to permit the formation of the distended preforms D.

It will be obvious to those skilled in the art that various changes may be made without departing from the spirit of the invention, and therefore, the invention is not limited to what is shown in the drawings and described in the specification, but only as to the scope of the appended claims.

What is claimed is:

1. The method of producing an elongated article from a relatively short depth article comprising depositing a preform on a mold, disposing said preform in receiving relationship to a transfer head of a configuration differing from that said mold, and drawing said preform into said transfer head and distending the same longitudinally to form a distended preform having a distended length far exceeding the practical depth of the originally deposited preform.

2. The method of producing an elongated article from a relatively short depth article comprising depositing a preform on a mold, disposing said preform in receiving relationship to a transfer head of a configuration differing from that said mold, and drawing said preform into said transfer head and distending the same longitudinally to form a distended preform having a distended length far exceeding the practical depth of the originally deposited preform, the material used in initially deposited preform being substantially equal to that in said distended preform.

3. The method of producing an elongated article from a relatively short depth article comprising depositing a preform on a mold, disposing said preform in receiving relationship to a transfer head of a configuration differing from that said mold, and drawing said preform into said transfer head and distending the same longitudinally to form a distended preform having a distended length far exceeding the practical depth of the originally deposited preform, providing said initially deposited preform with a non-planar cross section for providing excess material to permit said distended preform to be produced.

4. In combination, a mold comprising a surface portion having a shallow practical depth for receiving a shallow depth preform thereon, means for communicating a negative pressure to the surface portion of said mold, and a transfer head assembly matingly engageable on said mold surface and including a cavity having a depth far exceeding the practical depth of said mold and a configuration differing radically therefrom, said transfer head including means for communicating a negative pressure to the surface cavity whereby said shallow depth preform is distendingly transferred from said mold into said cavity to assure said radical shape.

5. In combination, a mold comprising a surface portion having a shallow practical depth for receiving a shallow depth preform thereon, means for communicating a negative pressure to the surface portion of said mold, and a transfer head assembly matingly engageable on said mold surface and including a cavity having a depth far exceeding the practical depth of said mold and a configuration differing radically therefrom, said transfer head including means for communicating a negative pressure to the surface cavity whereby said shallow depth preform is distendingly transferred from said mold into said cavity to assure said radical shape, said mold including a surface area substantially equal to the area of said cavity.

References Cited in the file of this patent

UNITED STATES PATENTS 2,800,945     Schilling _____ July 30, 1957

FOREIGN PATENTS 958,256     France _____ Sept. 12, 1949